US006591467B2

(12) United States Patent
Cardona

(10) Patent No.: US 6,591,467 B2
(45) Date of Patent: Jul. 15, 2003

(54) METHOD OF MANUFACTURING A THERMOFORMED HINGE

(75) Inventor: Peter G. Cardona, Hollywood, MD (US)

(73) Assignee: Sailing Specialties INC, Hollywood, MD (US)

( * ) Notice: Subject to any disclaimer, the term of this patent is extended or adjusted under 35 U.S.C. 154(b) by 0 days.

(21) Appl. No.: 10/072,883

(22) Filed: Feb. 12, 2002

(65) Prior Publication Data

US 2002/0178560 A1 Dec. 5, 2002

Related U.S. Application Data

(60) Provisional application No. 60/294,420, filed on May 30, 2001.

(51) Int. Cl.[7] .......................... B21D 53/40; B23P 11/00; B23P 11/02; E05D 7/10

(52) U.S. Cl. ............................... 29/11; 29/434; 29/450; 29/451; 16/266

(58) Field of Search ............................. 29/11, 434, 450, 29/451; 16/229, 230, 232, 255, 267, 277, 268, 266; 292/163; 49/394

(56) References Cited

U.S. PATENT DOCUMENTS

| | | | | |
|---|---|---|---|---|
| 5,231,948 A | | 8/1993 | Malmanger et al. | 114/201 |
| 5,265,310 A | * | 11/1993 | Ichinokawa | 16/266 |
| 5,377,396 A | | 1/1995 | Moran, Jr. | 53/40 |
| 5,669,106 A | * | 9/1997 | Daoud | 16/266 |

FOREIGN PATENT DOCUMENTS

DE 3414401 * 10/1985

* cited by examiner

*Primary Examiner*—John C. Hong
(74) *Attorney, Agent, or Firm*—David Newman

(57) ABSTRACT

A method of making a hinge joining two rigid pieces each with top and bottom surfaces, comprising the steps of thermoforming a first piece of rigid plastic material having a first hinge joint; machining a hole with a tubular shape through each of two external surfaces of the first hinge joint; thermoforming a second piece of rigid plastic material having a second hinge joint; machining two keyhole-shaped passage perpendicular to the length of the surface and across the width of the near-end external surfaces of the first protrusion and of the second protrusion of the second piece; inserting a hinge pin through each hole with a tubular shape; and assembling the two pieces with the first hinge joint fitting into the gap of the second hinge.

3 Claims, 7 Drawing Sheets

METHOD OF MANUFACTURING A THERMOFORMED HINGE

REFERENCE TO PROVISIONAL PATENT APPLICATION

This patent stems from provisional patent application having serial No. 60/294,420, and filed on May 30, 2001, entitled THERMOFORMED HINGE, by inventor PETER G. CARDONA. The benefit of the earlier filing date of the provisional patent application is claimed for common subject matter.

CROSS REFERENCE TO RELATED PATENT APPLICATION

This patent is related to a U.S. patent application filed concurrently herewith, entitled THERMOFORMED HINGE by inventor PETER G. CARDONA, in which the FIGURES, BRIEF DESCRIPTION OF THE DRAWINGS and DETAILED DISCUSSION OF THE PREFERRED EMBODIMENTS are identical to that disclosed herein.

BACKGROUND OF THE INVENTION

This invention relates to a thermoformed hinge, and more particularly to two hinge joints thermoformed from plastic material, which cooperatively work together with a hinge pin to make a hinge.

DESCRIPTION OF THE RELEVANT ART

Metal and plastic hinges have been used in the prior art for connecting two pieces together. A typical example would be a container for holding supplies, food and the like, as might be found on a sailing boat. U.S. Pat. No. 5,277,396 discloses a continuous plastic hinge, which assembles like a piano hinge. The hinge is machined from rigid plastic, and uses a series of hinge knuckles. U.S. Pat. No. 5,231,948 shows a hatch and a frame, which might be used on a boat.

A problem in the prior art is method of manufacturing these hinges. Typically, the rigid plastic material is shaped from injection molding.

SUMMARY OF THE INVENTION

A general object of the invention is to manufacture a plastic hinge as part of two rigid pieces.

Another object of the invention is a low cost hinge, which is part of two plastic pieces.

According to the present invention, as embodied and broadly described herein, a method for manufacturing a hinge joining two rigid pieces is provided. The hinge comprises a first hinge joint, a second hinge joint and a hinge pin.

The method of manufacturing thermoforms a first hinge joint, which protrudes from a first piece of rigid-plastic material. The first hinge joint has two external surfaces, with each of the two external surfaces parallel to each other. A distance between each of the two external surfaces is defined as a hinge-joint length. The method machines into each of the two external surfaces of the first hinge joint, a hinge hole with a tubular shape.

The method of manufacture thermoforms the second hinge joint, which protrudes from a second piece of rigid plastic material. The second hinge joint has a first protrusion containing a first hollow, and a second protrusion containing a second hollow. A distance between far-end surfaces of the first hollow and the second hollow is defined as a hollow length. A distance between near-end external surfaces of the first protrusion and the second protrusion is defined as a gap length. The gap length approximately is equal to the hinge-joint length such that the first hinge joint fits between the near-end external surfaces of the first protrusion and of the second protrusion.

The method of manufacture machines into each of the near-end external surfaces of the first protrusion and the second protrusion, a keyhole-shaped passage. The hinge pin is inserted in the hinge holes, and the tubular-central portion of the keyhole-shaped passages, so as to pass, aligned, through the hinge hole of each of the two external surfaces of the first hinge joint, and through the tubular central portion of each of the keyhole passages of the second hinge joint. The hinge pin hinges together the first piece and the second piece.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1:
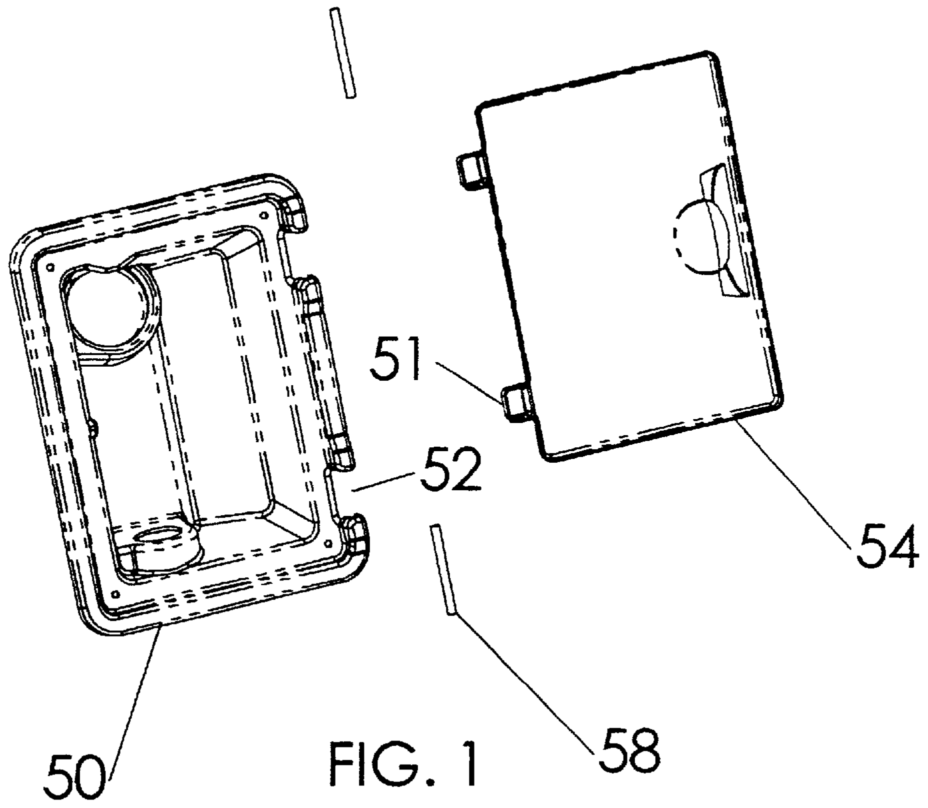
FIG. 1 illustrates a container and door, which are to be connected together by two hinges.

Reference now is made in detail to the present preferred embodiments of the invention, examples of which are illustrated in the accompanying drawings, wherein like reference numerals indicate like elements throughout the several views.

The instant invention disclosed herein provides a novel improvement and method for manufacturing a hinge. While the hinge broadly may be used with two pieces of rigid-plastic material, the invention, by way of example, is illustrated with a door and container, which are made from rigid-plastic material.

The method of manufacture employs thermoforming the first piece and the second piece, from plastic. Thermoforming typically is a process whereby a plastic sheet is heated until soft. While in the heated state, the plastic sheet is formed into a particular shape using a mold or die. The mold or die for the first piece includes the shape of the first hinge joint. The mold or die for the second piece includes the shape of the second hinge joint. The hinge hole and the keyhole shaped passages normally are not included in the respective mold or die for the first piece with the first hinge joint, and for the second piece with the second hinge joint.

An important aspect of the present invention is the thermoforming process. The die or mold for thermoforming normally cost less that one-half or one-third the cost of a die or mold for injection molding.

By thermoforming each piece from rigid-plastic material, with appropriate shape, the machining, and consequently the costs of manual labor is less.

The present invention broadly provides an improvement to a hinge joining two rigid pieces. The hinge comprises a first hinge joint, a second hinge joint, and a hinge pin. In FIG. 1, the invention is taught, by way of example, with the first rigid piece being a door 54, and the second rigid piece being a container 50 or frame for a container. A hinge pin 58 assembles a first hinge joint 51 and a second hinge joint 52.

Figure 2:
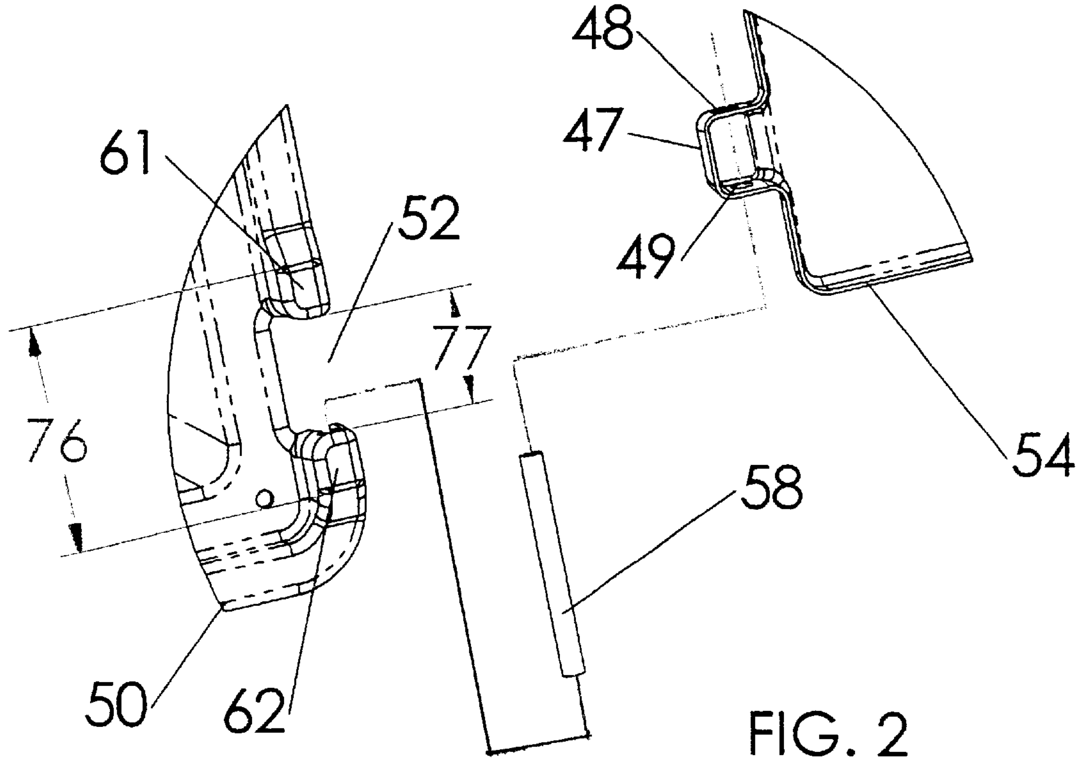
FIG. 2 illustrates a corner of the container and door, which are to be assembled with a hinge pin.

FIG. 2 illustratively shows an enlarged view of the first hinge joint 51, the second hinge joint 52 and the hinge pin 58. The first hinge joint 51 protrudes from a first piece of rigid-plastic material. For example, the first piece of rigid-plastic material is the door 54. The first hinge joint 51 has two external surfaces 48, 49, on each side of the first hinge joint 51.

The first hinge joint 51 protrudes from the rigid-plastic material 54. The shape of the first hinge joint 51 is manufactured during thermoforming the rigid-plastic material into the first piece, which in this illustrative example is the door 54. Typically, the first hinge joint maintains the normal thickness of the rigid plastic material, which might be in the range of three-sixteenth inch thick or one-quarter inch thick. Thus, the two external surfaces have empty space 47 between them, as shown in FIG. 2. As an alternative design, the space between the two external surfaces may be solid. The present invention will work with either a space 47 between the two external surfaces, or with solid plastic between the two surfaces 48, 49. The thermoforming process includes having a first mold or die including the shape of the first hinge joint, but typically without a hinge hole. The thermoforming process includes having a second mold or die including the shape of the second hinge joint, but typically without a keyhole-shaped passage.

Each of the two external surfaces 48, 49 are parallel to each other. A distance between each of the two external surfaces is defined as a hinge-joint length. The first piece of rigid-plastic material with the first hinge joint 51 preferably is manufactured by thermoforming the rigid-plastic material into the desired shape.

Figure 3:
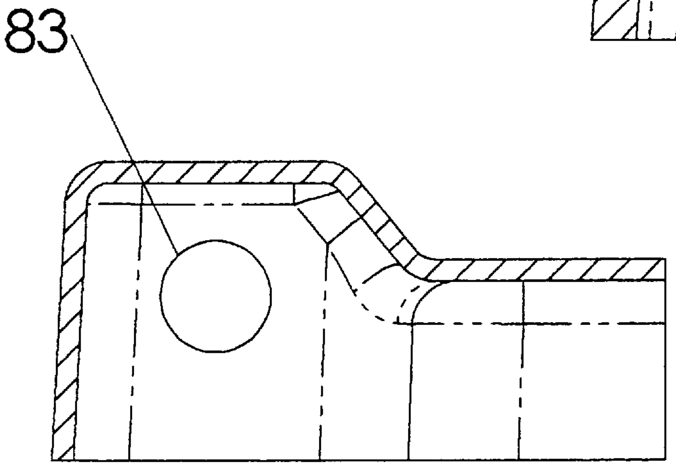
FIG. 3 shows a hinge joint with a surface of the hinge joint having a hinge hole.

Each of the two external surfaces 48, 49 of the first hinge joint 51 has a hinge hole 83 with a tubular shape, as shown in FIG. 3. Each hinge hole 83 typically is machined or drilled in the two external surfaces 48, 49, or from one external surface to the other external surface, if the first hinge joint is solid.

Figure 4:
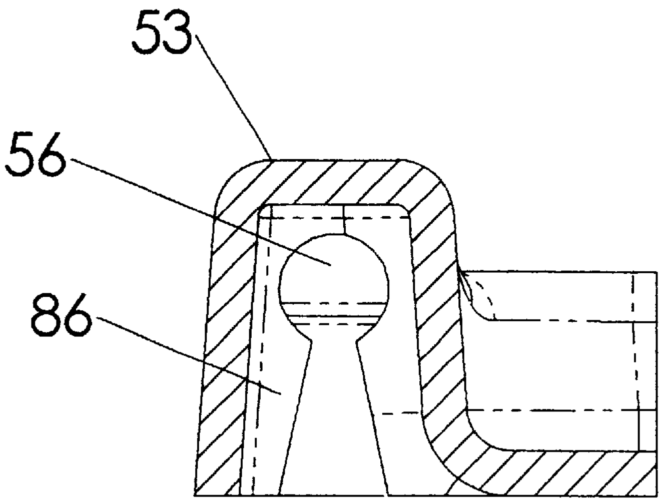
FIG. 4 shows a hinge joint with a shape of a hollow, with a surface of the hollow having a keyhole-shaped passage.

The second hinge joint 52, as shown in FIG. 2, protrudes from a second piece of rigid plastic material. The second hinge joint 52 has a first protrusion containing a first hollow 61 and a second protrusion containing a second hollow 62. The term hollow, as used herein, is defined as typically indented or concaved or depressed. Externally, the each hollow looks like a protrusion from the second piece of rigid-plastic material. FIG. 4 shows the shape of a protrusion of a second hinge joint 52, with each protrusion including a hollow 86. A typical hollow has a shape which is defined or made by thermoforming the rigid-plastic material. In FIG. 2, the rigid-plastic material is illustrated with the diagonal lines. In FIG. 4, the hollow is a protrusion from the top looking down, and an indented, concave or depressed area from the bottom looking up. The protrusion of FIG. 4, corresponds to the protrusion of each hollow 61, 62 shown in FIG. 2.

A distance 76, as shown in FIG. 2, between far-end internal surfaces of the first hollow 61 inside a first protrusion and of the second hollow 62 inside the second protrusion, is defined herein as a hollow length. A distance 77 between near-end external surfaces of the first protrusion containing the first hollow 61, and the second protrusion containing the second hollow 62, is defined herein as a gap length. The gap length of the second hinge joint 52 approximately is equal to the hinge-joint length of the first hinge joint 51 such that the first hinge joint 51 fits between the near-end external surfaces of the first protrusion containing the first hollow 61 and of the second protrusion containing the second hollow 62. The second piece of rigid-plastic material with the second hinge joint 62 preferably is manufactured from thermoforming plastic material into a desired shape.

Each of the near-end external surfaces of the first protrusion containing the first hollow 61 and of the second protrusion containing the second hollow 62 has a keyhole-shaped passage 56, as shown in FIG. 4. Each keyhole-shaped passage 56 is defined herein by a tubular-central portion and an outwardly-extending slot of narrower width extending to one of a top or bottom surface of the second piece. Each keyhole-shaped passage 56 typically is manufactured from machining or routing each of the near-end surfaces of the first protrusion containing the first hollow 61 and of the second protrusion containing the second hollow 62. In FIG. 4, the tubular-central portion of the keyhole-shaped passage typically has a continuous arc of about 150 degrees for contact with the hinge pin 58. Routers or drill bits for making a keyhole-shaped passage are well-known in the art. U.S. Pat. No. 5,377,396, in FIG. 3 shows an example of a ball-milling cutter 21, which can be used for making a keyhole-shaped passage. U.S. Pat. No. 5,377,396 is incorporated herein by reference.

Figure 5:
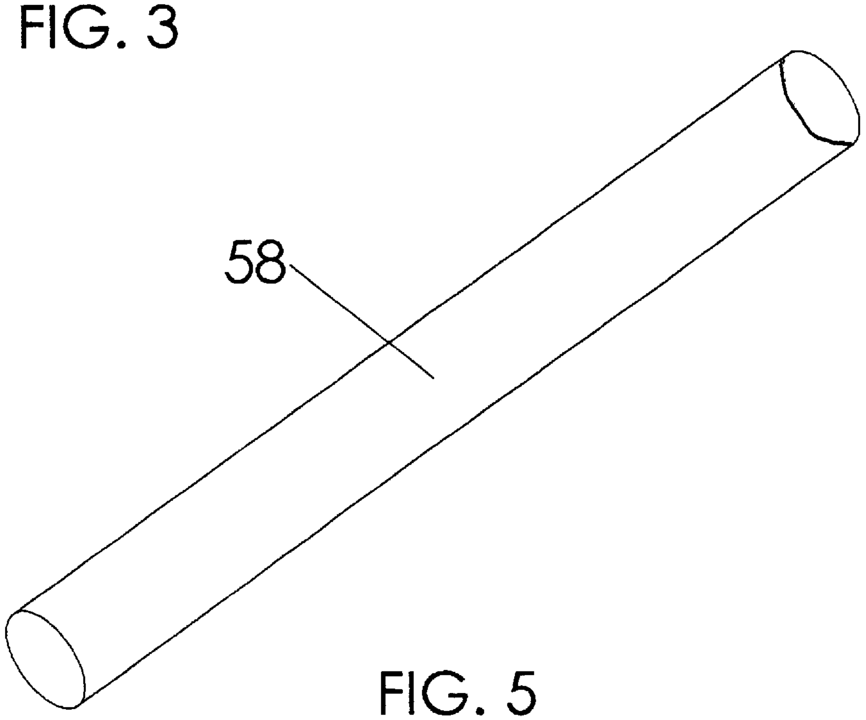
FIG. 5 shows a hinge pin.

FIG. 5 illustrates a tubular shaped, hinge pin 58. The hinge pin 58 may be made from metal, hollow plastic material, or solid plastic material.

Figure 6:
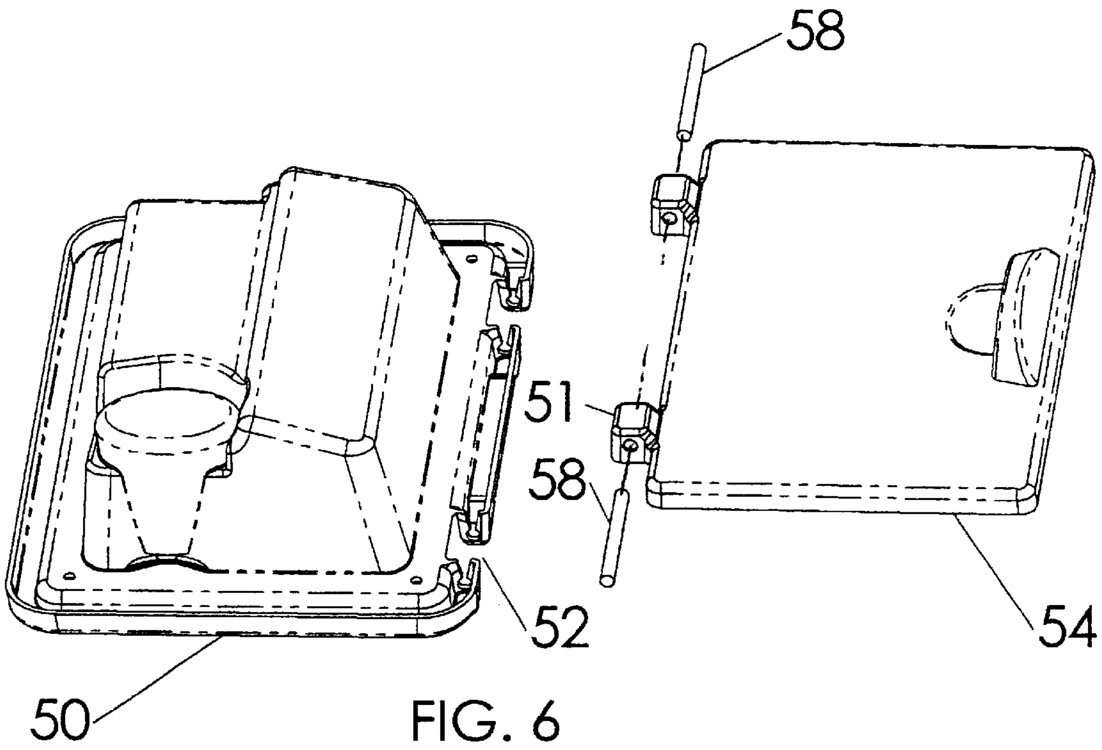
FIG. 6 illustrates a container and a lid with two hinges, and two hinge pins for assembling the container and the door.
Figure 7:
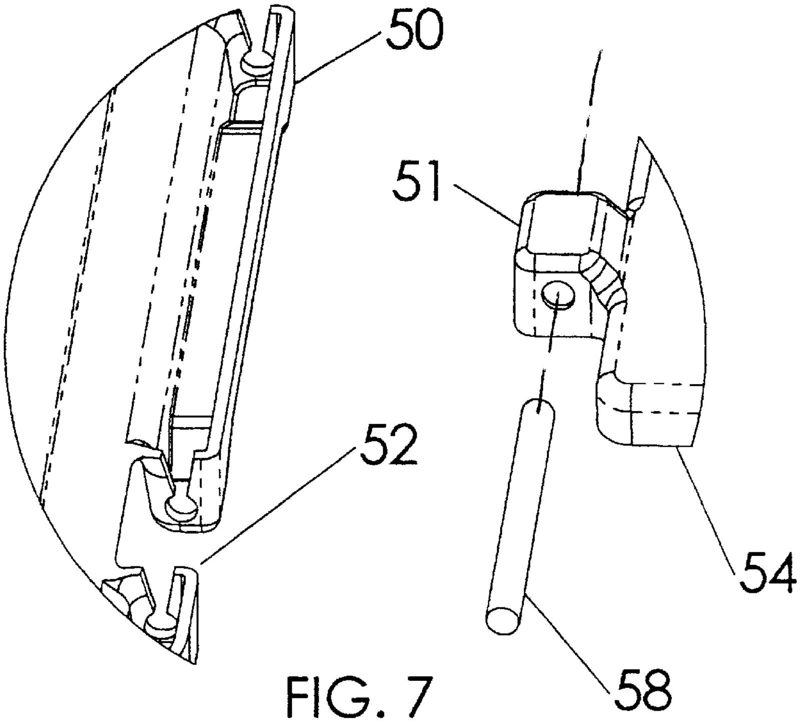
FIG. 7 shows the hinge pin being inserted to the holes of the first hinge joint.
Figure 8:
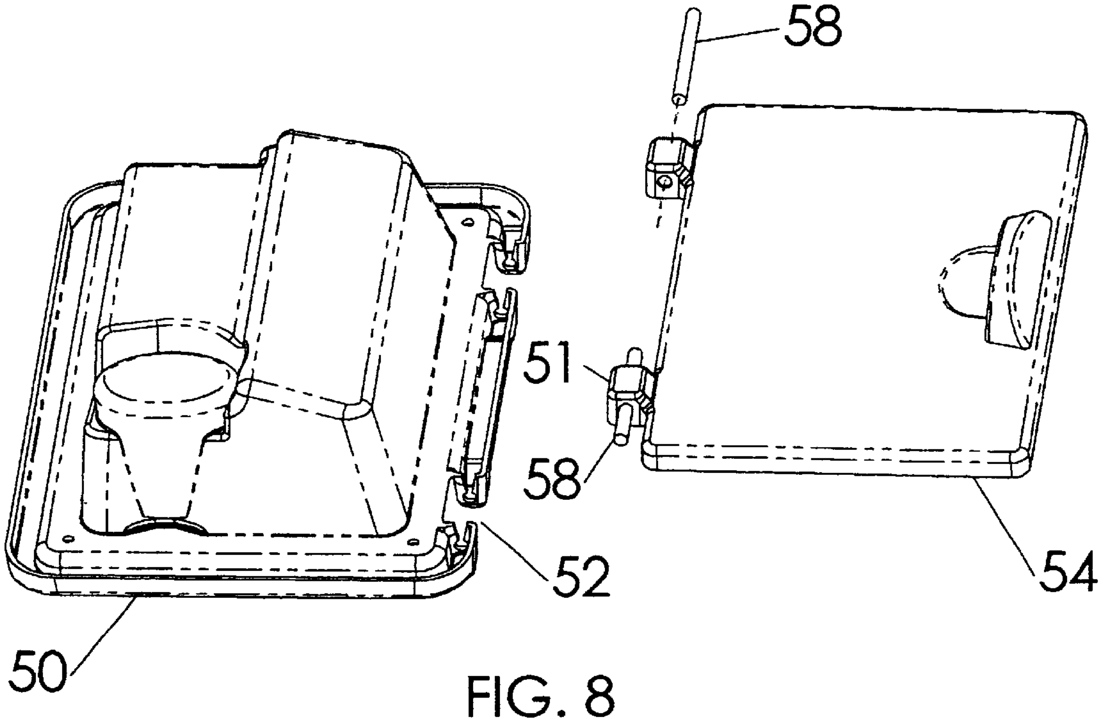
FIGS. 8 and 9 show the hinge pin inserted in the hole of the first hinge joint.
Figure 9:
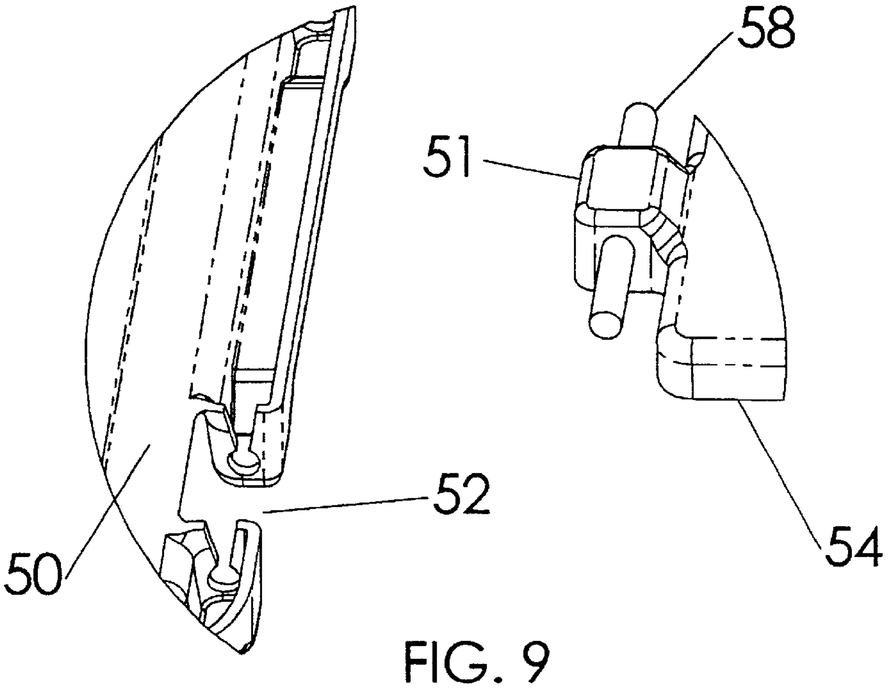
Figure 10:
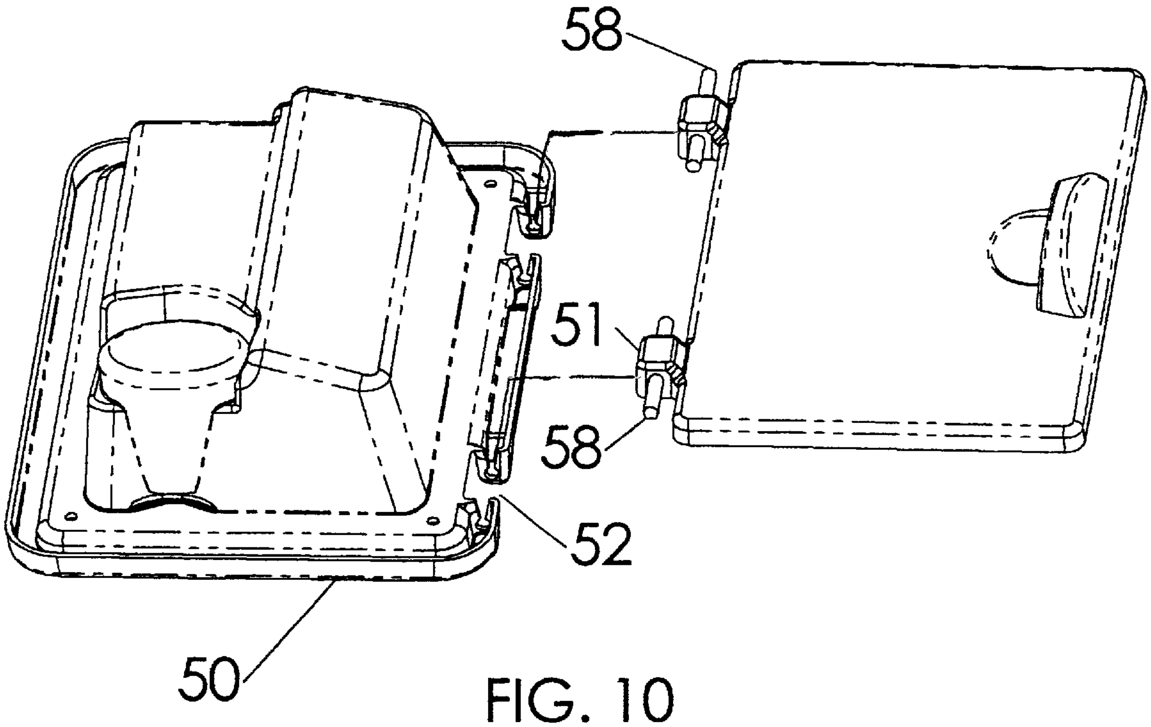
FIGS. 10 and 11 show the hinge pins inserted into the holes of each of the first hinge joints of each of the two hinges.
Figure 11:
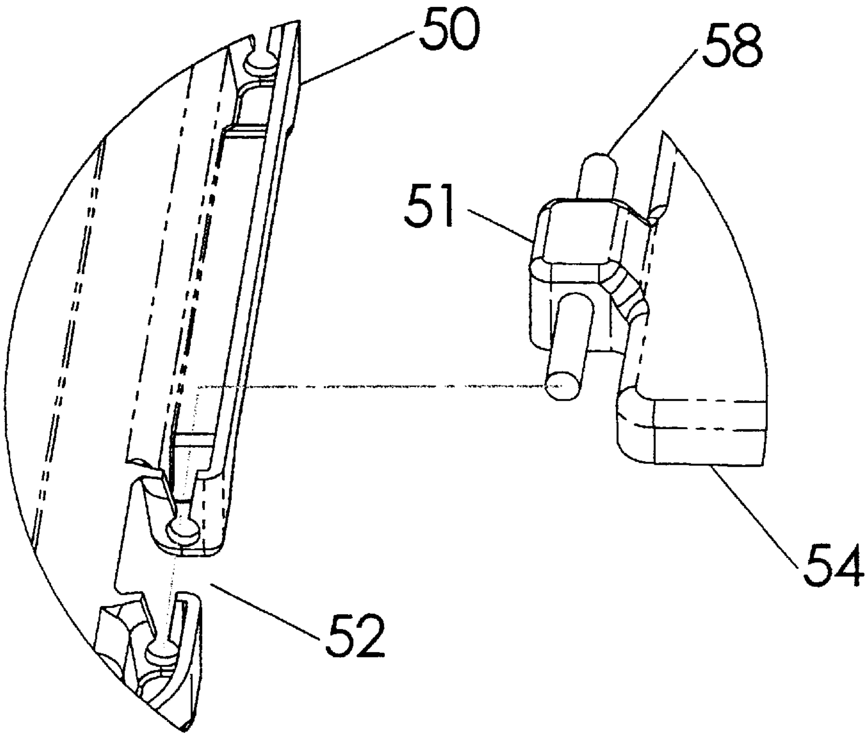
Figure 13:
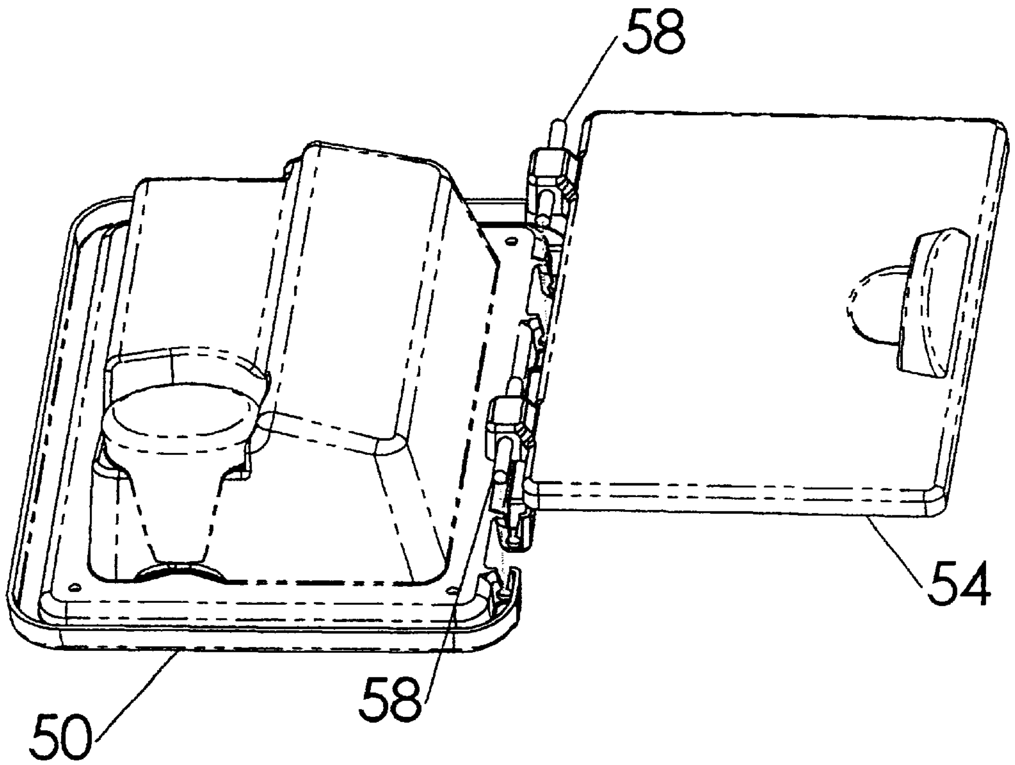
FIG. 13 illustrates, for two hinges, how the hinge pin, inserted in the hole of the first hinge joint, inserts into the keyhole-shaped passages of the second hinge joint.
Figure 12:
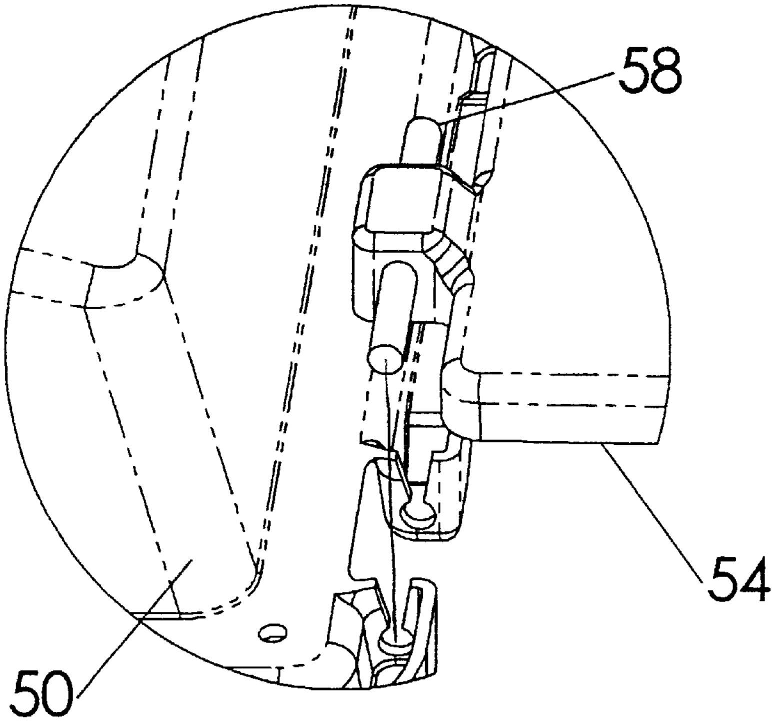
FIG. 12 shows how the hinge pin of one of the hinges inserts into the keyhole-shaped passage of the second hinge joint.

FIG. 6, and FIG. 7 as an expanded view, illustrate two hinge pins 58 being inserted into two holes of the first hinge joint 51. FIGS. 8 an 9 show the hinge pins 58 being inserted into the holes of each of the first hinge joints 51 of two hinges. FIGS. 10 and 11 show the hinge pin 58 ready for inserting into the keyhole-shaped passages of the second hinge joint 52. FIGS. 12 and 13 shows how the door 54 is assembled with the container 50, by inserting the hinge pins 58 for each hinge into respective keyhole-shaped passages.

Figure 15:
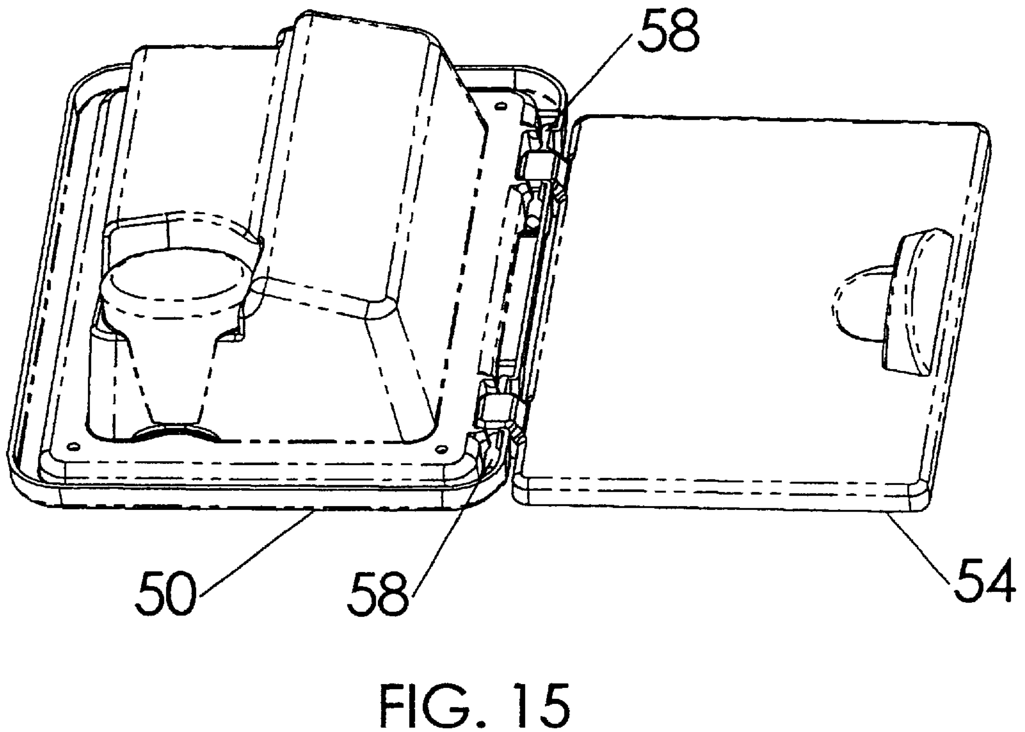
FIG. 15 shows the lid and container assembled, with the hinge pin inserted into the respective keyhole-shaped passages of respective hinges.
Figure 14:
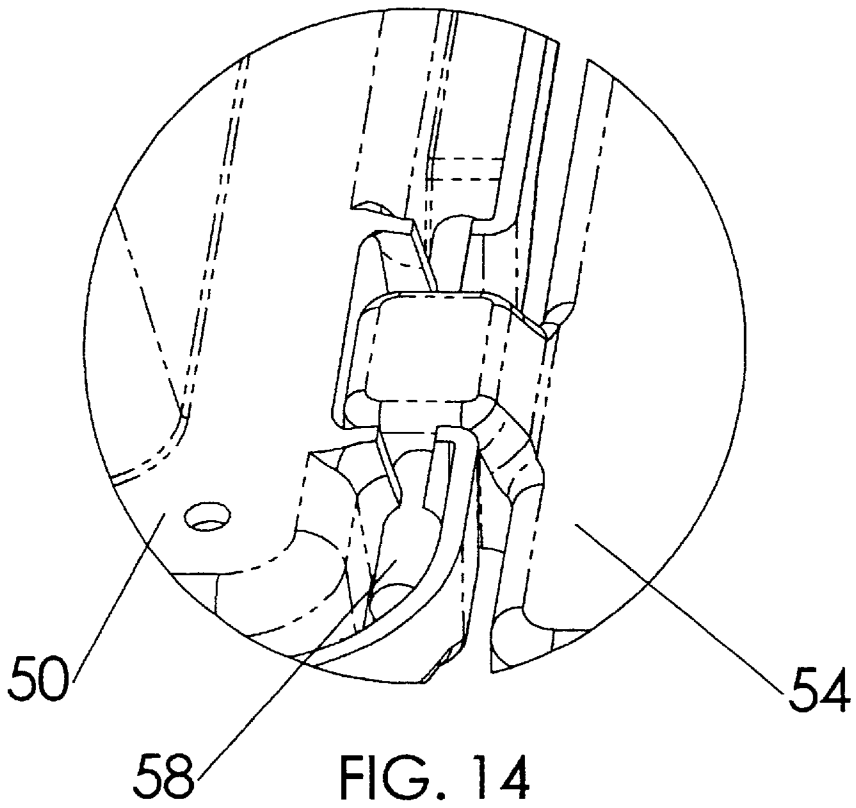
FIG. 14 shows the hinge pin inserted into the keyhole-shaped passage for one of the hinges.

FIG. 14 shows in detail, a hinge pin 58 inserted into the two hollows of the second hinge joint, with the first hinge joint inserted between the two near-end external surfaces of the protrusions containing the two hollows 61, 62. With this assembly, the hinge pin 58 passes, aligned, through the hinge hole of each of the two external surfaces of the first hinge joint, and through the tubular central portion of each of the keyhole-shaped passages of the second hinge joint. On each side of the keyhole-shaped passages, the hinge pin extends into the respective hollow. The hinge, in combination with the first hinge joint and the second hinge joint, hinges together the first piece and the second piece, as shown in FIG. 15. The hinge pin may have a diameter slightly smaller than the tubular central portions of the second hinge joint, and larger than the width of each hole of the first hinge joint. Conversely, the hinge pin may have a diameter slightly larger than the tubular central portions of the second hinge joint, and smaller than the width of each hole of the first hinge joint. Either embodiment provides for a rigid hinge pin, with the second piece turning on the hinge pin, or the first piece turning on the hinge pin. The hollows may be made small or possibly eliminated. The far-end internal surfaces would butt next to the protrusion of plastic used for the keyhole-shaped passage. Or a solid protrusion maybe be used, with the keyhole-shaped passage penetrating only a portion of the solid protrusion. If the hinge pin is slightly larger than the tubular central portions in the keyhole-shaped passages of the second hinge joint, then the hinge pin would not need to extend completely into the first hollow and the second hollow.

The present invention also comprises a method of making a hinge joining two rigid pieces. Each of the two pieces have a top surface and a bottom surface. The top surface and the bottom surface are not necessarily flat, and typically are molded to the desired shape of the article of manufacture. The method comprises the steps of thermoforming a first piece of rigid plastic material into the desired shape, and also having a first hinge joint 51. The first hinge joint 51 protrudes from the first piece and has two external surfaces. Each of the two external surfaces are parallel to each other. A distance between each of the two surfaces defined as a hinge-joint length. The method includes the step of machining a hole with a tubular shape through each of the two external surfaces of the first hinge joint 51.

The method thermoforms a second piece of rigid plastic material having a second hinge joint 52. The second hinge joint 52 protrudes from the second piece. The second hinge joint 52 has a first protrusion containing a first hollow 61 and a second protrusion containing a second hollow 62. A distance between far-end internal surfaces of the first hollow 61 and of the second hollow 62 are defined as a hollow length, distance between near-end external surfaces of first protrusion containing the first hollow 61 and of the second protrusion containing the second hollow 62 are defined as a gap length. The gap length approximately is equal to the hinge-joint length such that the first hinge joint 51 fits between the near-end external surfaces of the first protrusion containing the first hollow 61 and of the second protrusion containing the second hollow 62.

The method includes machining two keyhole-shaped passages perpendicular to the length of the surface and across the width of the near-end external surfaces of the first protrusion containing the first hollow 61 and of the second protrusion containing the second hollow 62 of the second piece. The two keyhole-shaped passages are previously defined. The method includes inserting a hinge pin 58 through each hinge hole with the tubular shape of the first hinge joint 51; and assembling the two pieces with the first hinge joint 51 fitting into the gap of the second hinge joint 52. The assembling is such that the tubular central portions of each keyhole-shaped passage of the second hinge joint 52, and each hole with the tubular shape in the two surfaces of the first hinge joint 51, are aligned. The assembling hinges together the first piece and the second piece.

It will be apparent to those skilled in the art that various modifications can be made to the thermoformed hinge and method of manufacture of the thermoformed hinge of the instant invention without departing from the scope or spirit of the invention, and it is intended that the present invention cover modifications and variations of the thermoformed hinge and method of manufacture of the thermoformed hinge provided they come within the scope of the appended claims and their equivalents.

I claim:

1. A method of making a hinge joining two rigid pieces each with top and bottom surfaces, comprising the steps of:

thermoforming a first piece of rigid plastic material having a first hinge joint, with the first hinge joint protruding from the first piece and having two external surfaces, with each of the two external surfaces parallel to each other, with a distance between each of the two external surfaces defined as a hinge-joint length;

machining a hole with a tubular shape through each of the two external surfaces of the first hinge joint;

thermoforming a second piece of rigid plastic material having a second hinge joint, with the second hinge joint having, protruding from the second piece, a first protrusion containing a first hollow and a second protrusion containing a second hollow with a distance between far-end internal surfaces of the first hollow and the second hollow defined as a hollow length, with a distance between near-end external surfaces of the first protrusion and the second protrusion defined as a gap length, with the gap length approximately equal to the hinge-joint length such that the first hinge joint fits between the near-end external surfaces of the first protrusion and the second protrusion;

machining two keyhole-shaped passages perpendicular to the length of the surface and across the width of the near-end external surfaces of the first protrusion and of the second protrusion of the second piece, with the two keyhole-shaped passages each being defined by a tubular central portion and an outwardly extending slot of narrower width extending to one of a top of bottom surface;

inserting a hinge pin through each hole with a tubular shape; and assembling the two pieces with the first hinge joint fitting into the gap of the second hinge joint, and such that the tubular central portions of each keyhole-shaped passage and each hole with the tubular shape of the two surfaces of the first hinge joint re aligned, for hinging together the first piece and the second piece.

2. The method as set forth in claim 1, wherein each of the first piece of rigid-plastic material and the second piece of rigid-plastic material is three-sixteenths inch thick.

3. The method as set forth in claim 1 wherein the hinge pin has a diameter slightly smaller than the tubular central portions and larger than the width of each hole of the first hinge joint.

* * * * *